United States Patent [19]
Wilson et al.

[11] 3,927,683
[45] Dec. 23, 1975

[54] BULK CURING BURLEY TOBACCO WITH A SEVEN DAY CURING CYCLE

[75] Inventors: Robert W. Wilson, Charlotte, N.C.; Eugene T. Akins, Bennettsville, S.C.

[73] Assignee: Powell Manufacturing Company, Inc., Bennettsville, S.C.

[22] Filed: Oct. 15, 1974

[21] Appl. No.: 515,092

[52] U.S. Cl. .......................... 131/140 R; 131/134
[51] Int. Cl.² ... A24B 1/02; A24B 3/12; A24B 9/00; A24B 15/00
[58] Field of Search ............ 131/133 R, 133 A, 134, 131/140 R, 135, 136

[56] References Cited
OTHER PUBLICATIONS

"Now! Bulk Curing for Barley" pp. 10–11 of *Farm and Livestock Weekly*, 1/17/74, by Bickers.
"Control Those Suckers on Your Burley Tobacco" by Atkinson, pp. 6–7 of *Kentucky Farmer*, pp. 6 & 7.
"Environmental Conditions for Curing Burley Tobacco" by Henson & Bunn, from *Tobacco*, Vol. 169, No. 24, pp. 4–45.
"Weight as an Indicator of Progress in Curing Burley Tobacco" by Bunn & Henson from *Transactions of the Asae*, (Vol. 11, No. 6, pp. 844–886, 1968).
"Engineering Studies on Curing Primed Burley Tobacco" by Henson & Bunn from *Transactions of the ASAE* (Vol. 14, No. 4, pp. 698–700, 1971).
"Effects of Curing Techniques on the Hygroscopic Properties of Primed Burley Tobacco" by Bunn, Henson & Smith from *Tobacco*, Vol. 165, No. 12, pp. 26–29, 9/22/67.
"Controlling Those Labor Costs in Burley" by Bradford, Smiley and Browning from the *Progressive Farmer*, 4/1973, pp. 29 & 56.
"They Bulk Cured Burley ... And Made It Work!" by Johnson from the *Progressive Farmer*, 3/1973, pp. 78B & 78F.
"A study of Controlled Curing Methods for Primed Burley Tobacco" by Bunn, Henson & Smith for Presentation at the 1965 Annual Meeting of ASAE.
"Use of Time-Lapse Photography in Tobacco Curing Research" by Henson, Bunn & Duncan from *Transactions of the ASAE* (Vol. 11, No. 3, pp. 409–411).
"Burley Mechanization" by Duncan & Abrams, May, 1971, from Cooperative Extension Service University of Kentucky.
"Genotypic Response of Burley Tobacco (Nicotiana Tabacum L.) to Air-Curing Detached Leaves" by Gupton from *Agronomy Journal*, Vol. 65, 9/73, pp. 801–804.
"Now! Bulk Curing for Burley" by Bickers; from *Farm and Livestock Weekly*, 1/17/74.
"Curing Burley Tobacco Can Be Difficult" by Augsberger from *Kentucky Farmer* 10/1972, p. 9.
"Conserving Burley Harvesting Labor" by Duncan *Kentucky Farmer*, Oct., 1972, p. 9.
"Know Your Burley Production Costs" *Kentucky Farmer*, March, 1973, p. 21 & 22.
"Experiments in Cutting Burley Curing Costs" by Liz Santen: Kentucky Farmer, p. 16 & 18, 9/1975.
"Tobacco News and Views" by Massie, August, 1974, p. 5.
"Control Those Suckers on Your Burley Tobacco" by Atkinson, *Kentucky Farmer*, p. 6.

*Primary Examiner*—Robert W. Michell
*Assistant Examiner*—V. Millin
*Attorney, Agent, or Firm*—Cushman, Darby & Cushman

[57] ABSTRACT

A method of bulk curing primed burley tobacco leaves successfully within an approximate one-week curing cycle utilizing bulk curing equipment currently used in curing bright leaf tobacco by effecting the coloring of the primed burley tobacco within a time period which does not exceed approximately 80 hours during which the leaves are subjected to temperature increases of no less than approximately ½° per hour and no greater than approximately 5° per hour and a maximum temperature of between 105° and 115° and relative humidity conditions of between 75% to 95% and then, after achieving the desired brown color, subjecting the leaves to a temperature increase which likewise does not exceed 5° per hour to initially set the desired brown color, whereafter the leaves are dried and then brought to order within a total time period which does not exceed approximately 168 hours.

9 Claims, 5 Drawing Figures

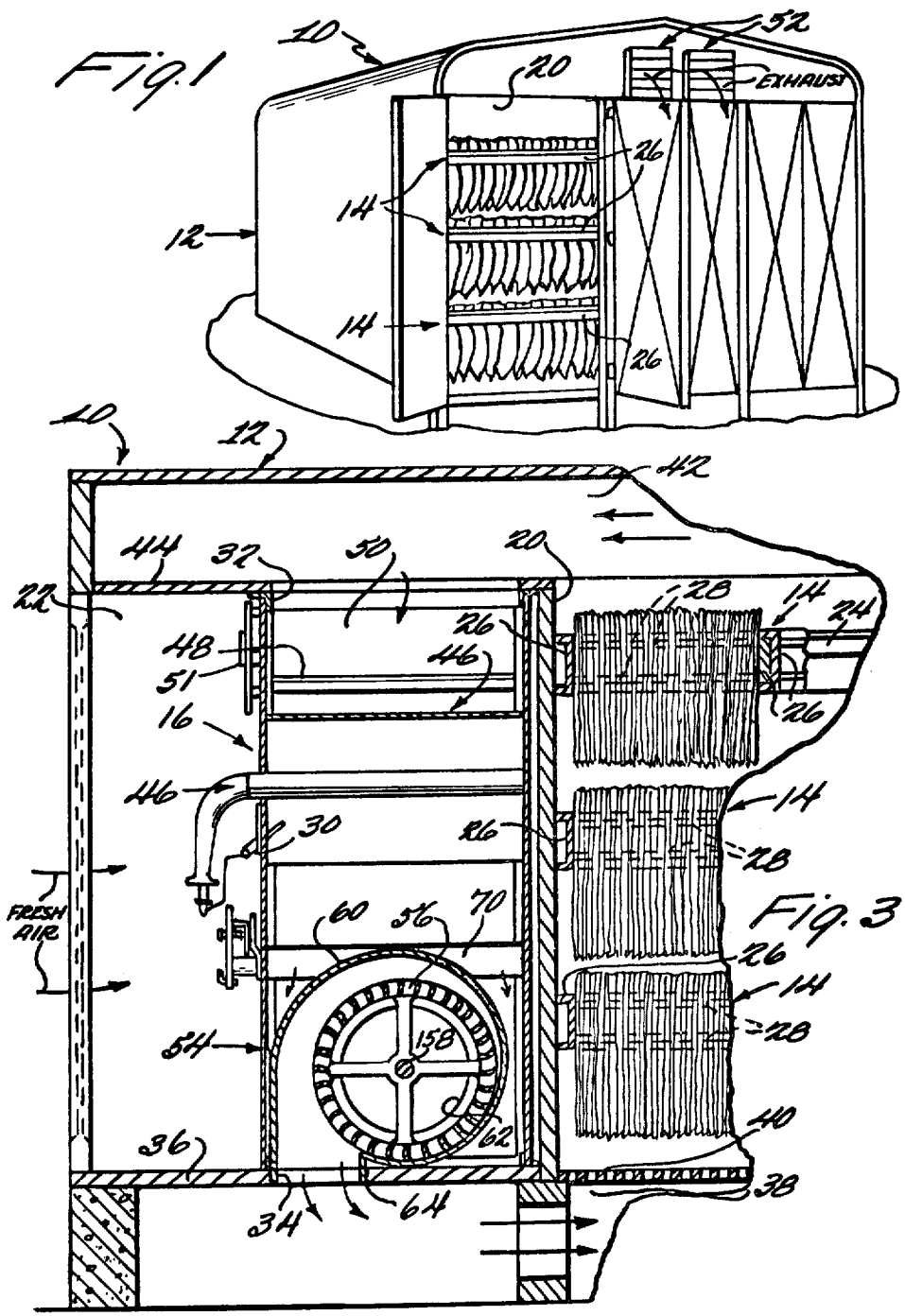

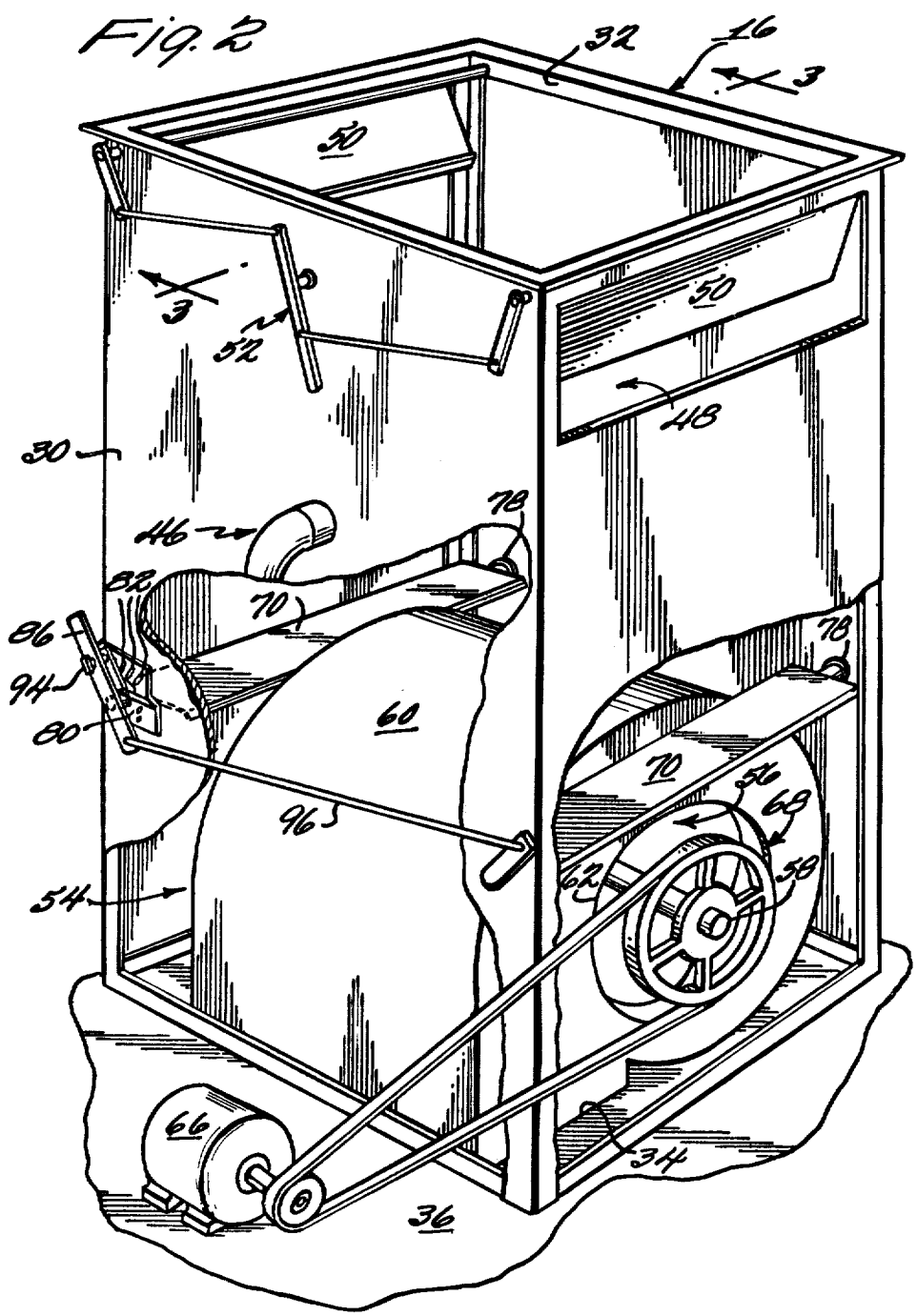

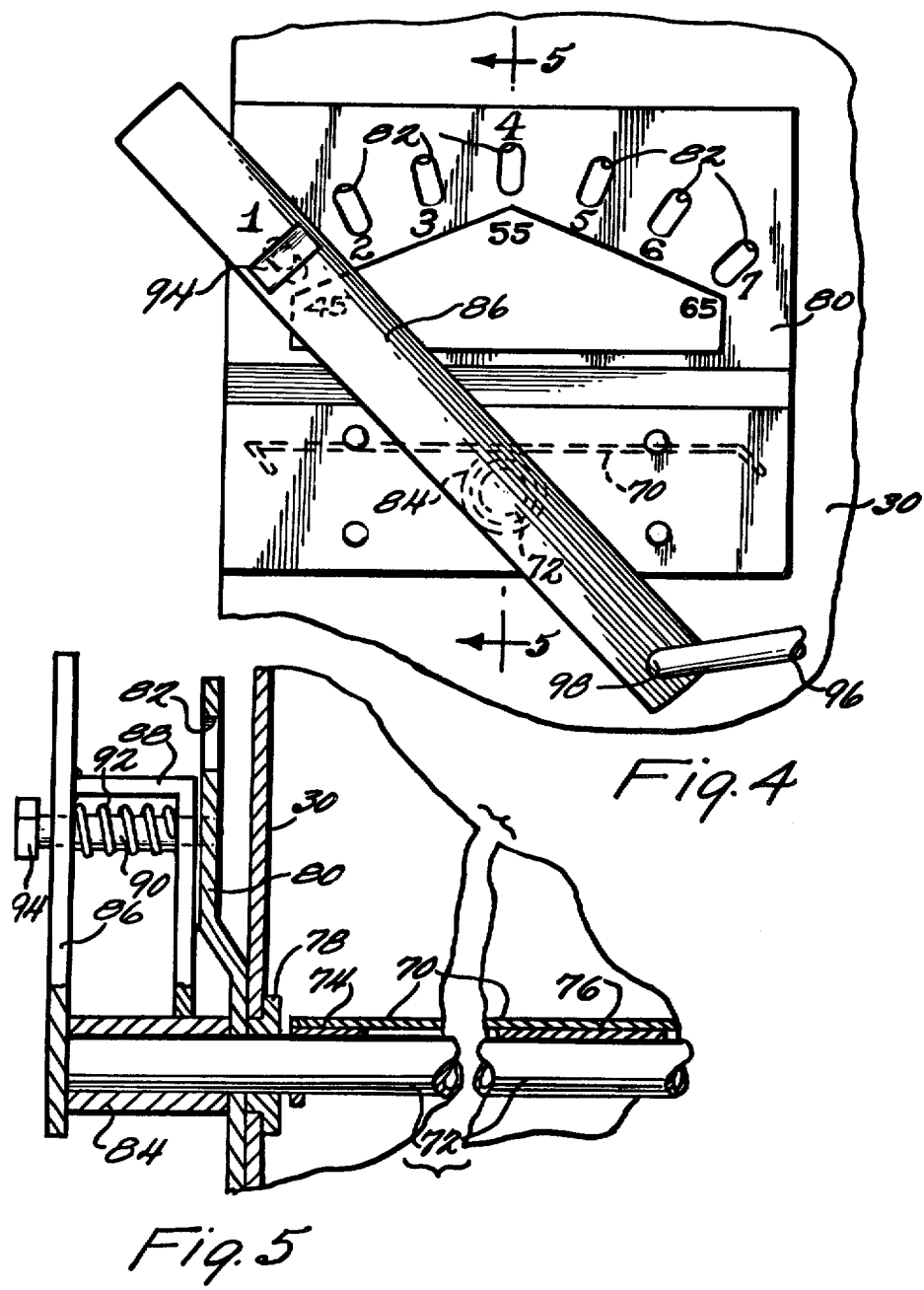

BULK CURING BURLEY TOBACCO WITH A SEVEN DAY CURING CYCLE

This invention relates to the curing of burley tobacco and more particularly to an improved method of bulk curing primed leaves of burley tobacco.

Traditionally, burley tobacco is a naturally ventilated air-cured tobacco. The curing is accomplished while the leaves are still attached to the stalk. In an effort to save the leaves on the lower part of the stalk and to allow the leaves on the upper part of the stalk to develop more fully before stalk harvest, partial priming of burley has been practiced by some burley producers. This practice involves from one to three primings of three or four leaves each, with the operation repeated at one or two-week intervals. The primed leaves are arranged in a conventional stalk-curing barn and allowed to cure with natural ventilation and a slight amount of supplementary heat.

In contrast to burley tobacco, which is grown primarily in the Kentucky tobacco belt, bright leaf or flue cured tobacco, which is grown primarily in the North Carolina tobacco belt, has traditionally been cured as primed leaf by heated air.

In order to reduce the manual labor requirements of curing bright leaf cured tobacco, a system of bulk curing primed bright leaf tobacco was developed by Francis J. Hassler which is disclosed in commonly assigned Hassler U.S. Pat. No. 3,110,326. Since 1960, when bulk curing was first successfully tested on a farm scale basis, the commercial practice of bulk curing in the bright leaf tobacco belt has become increasingly more widespread. Today bulk curing of bright leaf tobacco is generally accepted as an effective labor saving alternative to conventional bright leaf tobacco practices.

Almost since the advent of bulk curing of bright leaf tobacco, efforts have been made to adapt the principles of bulk curing to the curing of burley tobacco. Initial efforts were directed toward applying bulk curing techniques to the lower burley leaves which, as aforesaid, were sometimes primed and air cured as primed leaves along with the stalk attached leaves. The results of these early efforts are discussed in a paper prepared by Joe M. Bunn, Wiley H. Henson, Jr. and E. M. Smith of the University of Kentucky Engineering Department and published under the title "Effects of Curing Techniques on the Hygroscopic Properties of Primed Burley Tobacco" in Tobacco Science XI pp 124-127 and "Tobacco" Vol. 165 No. 12, pp 26-29, Sept. 22, 1967. The report deals with experiments conducted over a period of two successive tobacco seasons. During the first season, a two-week curing schedule was developed and in the second season an attempt was made to reduce the curing schedule to one week. These experiments are referred to in a 1971 article appearing in "Transactions of the ASAE" (Vol. 14, No. 4, pp 698-700) under the title "Engineering Studies on Curing Primed Burley Tobacco". This article refers to the two-week curing schedule of the initial season (see reference 8, Henson, W. H. Jr., and Bunn, J. M., 1965 Development of a two-week curing schedule for primed burley tobacco. Unpublished 1964 Research Report on Harvesting and Curing Burley Tobacco. Section 2:1-20. Dept. of Agricultural Engineering University of Kentucky, Lexington). The attempt at a one-week curing schedule in the next season (see reference 9) is summarized in the opening paragraph of the text as follows: "In the latter work an accelerated curing cycle of one week was employed to increase the seasonal capacity of the bulk curing barn and, thus, promote more economical use of the new curing barn. However, the accelerated cure produced burley tobacco that was judged off-type owing to an undesirable yellowish cast to the leaves. Such a yellow color in burley results from too rapid drying during the coloring stage of curing."

Despite recognition of the economic advantages in utilizing a one-week curing schedule rather than a two-week schedule, in the experiments performed after the second season, a return to the original two-week curing schedule was utilized. As stated in the second paragraph of the text, "The bi-weekly schedule was chosen to allow more time for the leaves to ripen on the stalk and also to allow additional time for obtaining the desirable leaf color."

The present invention is based upon the proposition that in order to make bulk curing economically feasible as a method of curing burley tobacco, it is essential that curing be successfully concluded within a period of approximately seven days. In order to appreciate the validity of this proposition, it is necessary to consider the curing procedures in relation to the harvesting procedures performed by the farmer preparatory to curing and the procedures performed by the farmer after curing in order to prepare the cured burley leaf for market. With respect to the harvesting procedures, it is evident that stalk harvesting requires considerably less labor than individual leaf harvesting by priming the leaves from the stalks. What must be borne in mind, however, is that the burley tobacco producer must prime the leaves from the stalks as an essential step in the after cure procedures to prepare the cured burley leaves for the market. The actual labor requirements for priming the cured leaves preparatory to marketing does not materially vary from those of priming green leaves in the field although, quite clearly, the quality of the labor requirements in terms of task difficulty and criticality of timing is less severe. These severities have been overcome to a considerable extent by the use of mechanized combines and harvesters in the bright leaf belt where in-field priming is practiced. Viewed in this light, the labor required in stalk harvesting burley tobacco simply constitutes an additional requirement over and above the labor required to prime the stalks when performed subsequent to the cure, rather than before.

In addition to the added stalk harvesting labor requirements in the traditional production of burley tobacco, the added stalk harvesting procedures also limit the quality of the tobacco produced. When a plant of burley tobacco is harvested by cutting the stalk, the leaves on the stalk will be in varying stages of maturity. The farmer seeks to accomplish harvesting at a time when the average maturity is most advantageous. This means that the middle leaves on the stalk are at optimum maturity, the lower leaves are over-ripe, while the upper leaves are immature. It is normal procedure for the burley tobacco farmer to grade his cured burley tobacco into at least three grades as part of the leaf priming step after cure.

In view of the above, it can be seen that bulk curing burley tobacco has an even greater labor saving and quality upgrade potential when used in lieu of traditional burley tobacco curing than when used in lieu of conventional bright leaf curing practices. The potential of bulk curing when used in lieu of conventional bright leaf tobacco practices is recognized today to actually save 50% in labor. As indicated above, an even greater potential improvement (e.g. 70%) is possible when applied to burley tobacco. Projected labor saving by bulk curing burley tobacco can be conservatively estimated at 100 man/hours per acre, which at $3.00 per hour, means a cost saving of $300. per acre. Whether this labor cost saving is actually obtainable is determined by the economics surrounding the use of the curing equipment. It will be appreciated that the costs of bulk curing equipment greatly exceed the costs of burley tobacco air curing equipment on a per unit of tobacco handling volume basis. Traditional burley tobacco air curing practices require a tobacco handling volume capable of handling the entire crop at one time. If the bulk curing equipment had to have equal capacity it would be clearly prohibitive in cost. Equal capacity is, however, not required because bulk curing equipment can be used to cure more than one load of tobacco in a single curing season. Quite clearly then, the capacity of the bulk curing equipment required is reduced as a direct function of the number of times the equipment can be used to cure successive loads, which number, in turn, is a direct function of the curing cycle time of the equipment.

Bulk curing equipment capable of successfully operating on a one-week cycle requires an estimated investment of only approximately 60% of the traditional air curing equipment of comparable capacity due to the ability to receive more tobacco per unit volume in a compressed bulk condition despite the greater cost per unit of tobacco handling volume. The same equipment operating on a two-week cycle would have to be doubled to handle the same total yearly volume, thus increasing the capital costs to approximately 120% of the comparable air curing equipment.

Another significant economic factor which enters the picture is operating costs. Burley tobacco air curing equipment has virtually no operating cost, the fuel costs where some heat is added are insignificant. On the other hand, bulk curing equipment requires the continuous use of electricity to run the fan and fuel to fire the furnace. These operating costs, which are increasing rapidly, can be estimated to be roughly 15 to 20% of the dollar value of the labor saved, utilizing one-week cycle bulk curing equipment. For a two-week cycle, as much as 40% of the labor costs saved would be offset by the operating costs.

These estimates make it quite clear that the economical advantages of bulk curing burley tobacco on a one-week cycle rather than a two-week cycle, constitute a significant, if not a critical, factor in the determination of whether or not bulk curing will be adopted as an improved method of curing burley tobacco. The significance of a substantial one-half reduction in the economics of bulk curing burley tobacco, while recognized by eminent burley tobacco curing experts, was not successfully achieved by them. Whereas, the desirability of this result was recognized by the experts and attempts were made by them to achieve the result, the subsequent efforts wherein the two-week cycle previously found operationally feasible was reverted to constitutes ample evidence of the difficulties presented in achieving the result.

Accordingly it is an object of the present invention to provide a method of bulk curing primed burley tobacco leaves successfully within an approximate one-week curing cycle. In accordance with the principles of the present invention, this objective is obtained by utilizing bulk curing equipment currently used in curing flue cured or bright leaf tobacco and effecting the coloring of the primed burley tobacco within a time period which does not exceed approximately 80 hours during which the leaves are subjected to temperature increases of no less than approximately ½° per hour and no greater than approximately 5° per hour and a maximum temperature of between 105° and 115° and relative humidity conditions of between 75% to 95% and then, after achieving the desired brown color, the leaves are subjected to a temperature increase which likewise does not exceed 5° per hour to initially set the desired brown color, whereafter the leaves are dried and then brought to order within a total time period which does not exceed approximately 168 hours.

Since the present method utilizes existing bright leaf tobacco bulk curing equipment, it is first pertinent to obtain an understanding of the structure and functioning of this equipment so that the burley tobacco curing procedures of the present invention can be related thereto for purposes of enabling those skilled in the burley tobacco curing art to successfully practice the invention. A disclosure of the existing equipment is contained in commonly-assigned U.S. Pat. No. 3,664,034 to Wilson, the description of which is substantially repeated herein in conjunction with drawings accompanying this description so that the present disclosure will be substantially self-contained.

In the drawings:

FIG. 1 is a perspective view of a tobacco curing apparatus used in practicing the principles of the present invention:

FIG. 2 is a fragmentary perspective view of the air conditioning and circulating assembly of the apparatus with parts broken away for purposes of clearer illustration;

FIG. 3 is a fragmentary sectional view taken along line 3—3 of FIG. 2;

FIG. 4 is an enlarged fragmentary front elevational view of the curing air flow rate throttling means; and FIG. 5 is a fragmentary sectional view taken along line 5—5 of FIG. 4.

Referring now more particularly to FIG. 1 of the drawings, there is shown therein a tobacco curing apparatus, generally indicated at 10, which includes a curing barn structure, generally indicated at 12, constructed in accordance with the teaching of Hassler U.S. Pat. No. 3,110,326.

The curing barn structure 12 is adapted to receive and support a plurality of bulk curing racks, generally indicated at 14, constructed in accordance with the teachings of commonly assigned U.S. Pat. No. 3,244,445, dated Apr. 5, 1966, the disclosure of which is hereby incorporated by reference into the present specification. As stated in the aforesaid Wilson and Hassler patents, each of the bulk curing racks 14 is operable to support a multiplicity of tobacco leaves within the barn structure 12 for curing by the passage of curing air vertically therethrough.

As best shown in FIGS. 2 and 3, the apparatus 10 includes a curing air conditioning and circulating assembly, generally indicated at 16, constructed in accordance with the principles of the present invention. In general, the assembly 16 is operable to establish a forced flow of heated air upwardly through the leaves carried by the bulk curing racks within the curing barn 12 to effect cure of the leaves.

The principles of the present invention can be adequately understood without a description of the details of the curing barn structure 12. Reference may be had to the aforesaid Hassler U.S. Pat. No. 3,110,326, and Wilson U.S. Pat. No. 3,134,583, for these details. For present purposes, it is important merely to note that the curing barn structure provides one or more curing compartments 20, there being three such compartments provided in the barn structure shown in FIG. 1. The three curing compartments 20 are disposed in side-by-side relation with the outermost compartments extending the full depth of the barn structure and the central compartment being of lesser length so as to provide an area, generally indicated at 22 in FIG. 3, disposed rearwardly of the central compartment and between the rear end portions of the outer compartments within which the curing or air conditioning and circulating assembly 16 is mounted.

Each of the curing compartments 20 is provided with rack supporting rails 24 which, as best shown in FIG. 3, are disposed three vertically spaced, horizontally aligned pairs on opposite sides of each compartment. The curing compartments define a tobacco loading and curing space through which the curing air passes vertically upwardly. It will be understood that while a vertically upwardly flow is preferred, a vertically downward flow may be utilized if desired.

Each horizontally aligned pair of rails 24 slidably receives and supports a plurality of bulk curing racks 14. Here again, the details of construction of the bulk curing racks 14 need not be described in order to understand the principles of the present invention. References may be had to the disclosures contained in the aforesaid Wilson patents for these details. For present purposes, it is sufficient to indicate that each rack includes a pair of complementary rack sections 26 separable to permit the loading of a multiplicity of tobacco leaves therebetween, and movable together to retain the loaded leaves therein. Each rack also includes a plurality of elongated spikes or prongs 28 which serves to pierce the tobacco leaves when the rack sections are moved together and to provide for interior support of the multiplicity of leaves secured within the rack during curing. The rack sections provide for peripheral support of the multiplicity of leaves when the rack sections are secured together, such peripheral support retaining the leaves together in an initially compressed condition in the manner described in the aforesaid Hassler patent.

The racks are of a size complementary to the curing chambers 20 so that when a plurality of such racks is supported on the rails 24 within each curing compartment 20 the leaves to be cured are supported for curing in three vertically spaced compact beds of leaves which uniformly fill the curing compartment in such a way as to insure that the curing air will pass through the leaves of the beds in series.

The curing air conditioning and circulating assembly 16 is operable to provide effective control of the rate of air flow through the tobacco supported by the racks 14 within the compartments 20 of the apparatus 10 during the curing process. The assembly 16 comprises certain known components including a vertically extending main housing 30 of conventional skeletonized frame and sheet metal construction mounted within the area 22 and forming a part of an endless circulatory curing air flow path which, for convenience, can be described as commencing with an inlet opening 32 defined by the upper end of the housing 30 and extends therefrom in the direction of flow downwardly through the housing 30 to a discharge or outlet opening 34 formed in an imperforate floor structure 36 defining the lower surface of the area 22. From the discharge opening 34 the air flows into an inlet space 38 which communicates with the curing compartments through perforated floor structures, generally indicated at 40. If desired, vanes (not shown) may be provided within the space 38 adjacent the outlet opening 34 for the purpose of insuring an even distribution of the air to the floor structure associated with each compartment.

Each floor structure 40 is preferably of perforated metal construction, such as expanded metal or the like, in accordance with conventional practice, which renders the apparatus suitable for drying other crops, although it will be understood that other floor structures may be provided if desired, as for example, spaced wooden slats or the like. Moreover, it will be understood that the apparatus 10 will operate to cure tobacco without the provision of a floor structure 40. The floor is a definite convenience during loading and unloading and renders the apparatus capable of being conveniently used for drying other crops.

The floor structures define the lower surface of the tobacco loading compartments through which the curing air flows vertically upwardly. The upper end of the curing compartments freely communicate with an upper return air space 42 defined along its upper surface by the roof of the barn structure. The endless curing air flow path is completed by communicating the upper space 42 with the upper inlet opening 32 of the housing 30 as by a roof structure 44 which defines the upper surface of the area 22.

The temperature of the curing air is controlled by means of a burner unit, generally indicated at 46. The burner unit as shown is gas fired, and may be of any conventional construction, either oil or gas fired. As shown, the burner unit communicates directly with the interior of the housing so that the products of combustion pass into the curing air. Such an arrangement is preferable with a gas fired burner unit. On the other hand, it is preferable where an oil fired burner unit is employed to discharge the products of combustion through a separate chimney or stack and to heat the air through a suitable heat exchanger, all in accordance with conventional practice. It will be understood that the burner unit is preferably provided with suitable controls (not shown) such as a thermostat or the like for effecting operation thereof in accordance with conventional practice.

In order to control the relative humidity of the curing air, the housing 30 is formed with fresh air inlet means 48 which, as shown, is in the form of two rectangular openings, one on each side of the housing adjacent the upper end thereof. The amount of fresh air introduced into the flow path is controlled by a damper member 50 movably mounted within each fresh air inlet opening 48, the two dampers being interconnected for movement together by a lever and connecting rod assembly 51 of generally conventional construction. When the damper members 50 are adjusted to permit the introduction of fresh air through the inlet openings 48 additional air is supplied to the system and, for the purpose of permitting the discharge of a generally corresponding amount of air from the circulatory path, there is provided a pair of louvre units 52 which forms a part of the overall damper means for controlling the introduction and exhaust of air into and out of the circulatory path of flow.

As best shown in FIG. 1, the louver units 52 are mounted in the front wall of the barn structure in communication with the upper portion of the barn. The units are of the type adapted to open outwardly in response to a predetermined air pressure in the upper portion of the barn structure. Thus, the louver units 52 will remain closed when the fresh air inlets are closed so that the entire system is effectively closed and the curing air will merely recirculate in the circulatory path. When fresh air is allowed to be introduced through the inlet openings 48, the pressure will build up in the upper portion of the barn structure resulting in the exhaust of air in the circulatory path of flow outwardly to the atmosphere through the louver units 52. The louver units thus serve to permit a discharge of air from the circulatory path commensurate with the amount of fresh air introduced to the circulatory path.

While the damper means described above is preferred, it will be understood that the essential characteristic for the control of relative humidity is to have a fresh air inlet opening and an outlet opening for the discharge of circulating air and a controllable damper unit associated with at least one of the openings. For example, louver unit 52 could simply be eliminated leaving the discharge outlet open or louver unit 52 could be controlled in lieu of damper means 50 and the latter could be either eliminated or replaced with a unit, such as louver unit 52.

It will be understood that the fresh air inlet damper means as well as the thermostat controls of the burner unit may be automatically operated as, for example, by the control mechanism disclosed in commonly assigned U.S. Pat. No. 3,503,137, dated Mar. 31, 1970, as well as other types of automatic as well as semi-automatic control mechanisms known in the art. The disclosure of U.S. Pat. No. 3,503,137 is hereby incorporated by reference into the present specification.

The circulation of curing air within the flow path is provided by a rotatable fan or blower, generally indicated at 54, mounted within the housing 30 with its suction side downstream from the fresh air inlet openings 48. As shown, the fan or blower is of the squirrel cage type, having a rotor blade assembly 56 mounted on a horizontal shaft 58 suitably journaled within the housing 30 surrounded by a casing 60 providing axial inlet openings 62 spaced from the adjacent wall of the housing 30 and a generally tangential outlet 64 connected with the outlet opening 34 in the floor structure 36. As best shown in FIG. 2, one end of the shaft 58 extending outwardly of the housing 30 is connected with a driving motor 66, as by a belt and pulley assembly 68. In accordance with conventional practice, the motor 66 is preferably an electrical motor of suitable horsepower as, for example, 7½ horsepower, with an operating rpm of 1725, the belt and pulley assembly t8 being operable to reduce the output rpm of the electric motor to an exemplary 625 rpm of the blower rotor blade assembly 56.

It will be understood that other types of blowers may be utilized, as for example, radial blade fans and the like. The preferred power driven blower exemplified above has a rated capacity capable of establishing a continuous operational flow through the discharge opening 64 of approximately 16,500 cfm at the end of the drying procedure. The rated capacity of the fan is determined at the end of the cure because the fan is operating more nearly at its maximum capacity at this time. It will be understood that a relatively small change in cfm output will occur because of the changing resistance to flow offered by the leaves as they diminish in size during the cure due to loss of moisture.

The rated capacity of the fan is given only as an example and is related to the specific air flow requirements of the exemplary barn structure herein disclosed. In general, the air flow requirements can most conveniently be expressed in terms of a cubic feet per minute flow per square foot of effective curing area provided by the apparatus. The effective curing area of the apparatus is herein defined as the horizontal cross-sectional open area (i.e. between the rails 24) of all compartments 20 less the cross-sectional area therein assumed by the rack section structure in one tier or the cross-sectional area within which the leaves of one tier are confined. The effective curing area is determined by the leaf confining area in one tier only for the reason that the same curing air passes through the leaves in each tier regardless of whether there are two, three or more. The effective curing area of the exemplary barn structure referred to above is approximately 257 square feet.

In accordance with the principles of the present invention, the rated capacity of the motor driven fan 54 is chosen at a value within an operative range of between 50 cfm and 120 cfm for each square foot of effective curing area. A preferred range is from 55 cfm to 75 cfm and the preferred example enumerated above is about 65 cfm per square foot of curing area.

The curing air controlling and circulating assembly 16 is provided with means for throttling the rate of air flow established by the fan 54. To this end, with the embodiment shown, there is provided a pair of movable damper members 70 mounted within the housing 30 in a position upstream from the fan casing inlet openings 62 and downstream from the fresh air inlet openings 48. As best shown in FIGS. 4 and 5, each damper member 70 is formed from a rectangular piece of sheet metal having its londitudinal edges bent in parallel directions. Each damper member is fixedly secured to a shaft 72, preferably in the form of a hollow tubular member, as by a pair of angular end brackets 74 and a central plate 76 suitably welded to the damper member 70 and the tubular shaft. The ends of each shaft 72 are suitably journaled within appropriate bearings 78 carried by the adjacent frame and walls of the housing 30, the shaft end at the front wall adjacent the left side of the housing extending outwardly through an opening formed in a dial plate 80 fixed to the outer surface of the adjacent wall of the housing.

As best shown in FIG. 4, the dial plate 80 includes a plurality of openings 82 which, as shown, are seven in number, equally spaced arcuately about the axis of the shaft 72. A sleeve 84 is detachably rigidly secured to the protruding end of the shaft and has an actuating lever 86 fixedly secured thereto and extending radially outwardly from the outer end thereof. An L-shaped strap member 88 is rigidly connected, as by welding or the like, between an outer end portion of the lever and the inner end portion of the sleeve 84. The lever and strap are formed with registering openings for receiving a latch pin 90, the inner end of which is adapted to selectively engage within one of the openings 82 in the dial plate 80. The latch pin 90 is spring urged in a direction to engage within the openings as by a coil spring 92 disposed in surrounding engagement with the pin with one end in engagement with the adjacent surface of the lever and the opposite end in engagement with a cotter key or the like extending through the pin. The outer end of the latch pin includes a handle portion 94 by which the operator effects manual movement of the pin outwardly of the openings 82, against the action of the spring 92, permitting manual movement of the lever 86 into any desired position of adjustment. Movement of the damper member 70 associated with the manual lever 86 is transmitted to the other damper member 70 by means of a connecting rod 96 pivoted at one end to the lever 86, as indicated at 98 and at its other end to the outer end of an actuating arm 100, the inner end of which is fixed to the associated shaft 72.

It will be noted that when the actuating lever 86 is moved between its limiting positions defined by the outermost openings 82, the damper members 70 will be moved from a horizontal to a vertical position within the housing. With the dampers in their vertical position, the flow rate of the fan 54 is substantially at its rated capacity. It will be noted however, that when the damper members 70 are disposed in their horizontal position, the area of the flow path to the fan casing inlet openings 62 is diminished, being restricted to the flow past the ends of the vertically disposed damper members 70 on opposite sides of the fan casing ends. In this way, the rate of air flow of the fan 54 is throttled down to an operative range of from 10 cfm to 50 cfm for each square foot of effective curing area. A preferred range is from 40 cfm to 45 cfm and in the exemplary embodiment described, an approximately 45 cfm rate of flow is established. The throttled down operative range of flow rates is utilized during the yellowing stage of the curing process, the flow rate utilized within the operative range being increased at least 10 percent during the subsequent drying stages in the curing process. Where the flow rate utilized is within the preferred range, the increased flow rate during the drying stages is at least 30 percent and in the specific example the increase is from 45 cfm to 65 cfm or approximately 45 percent. It will be understood that while the throttling damper members 70 are shown as being preferably positioned on the suction side of the fan, it is within the contemplation of the present invention to position the throttling damper members on the pressure side of the fan means as well.

It will also be understood that with the seven positions of adjustment numbered 1 through 7 provided by the adjusting mechanism shown, the operator may utilize flow rates both for yellowing and drying which are intermediate the minimum and maximum flow rates. These seven positions designate flow rates from 45 to 65 cfm in the illustrative embodiment shown at increments of 3 ⅓ cfm. This range of adjustability is particularly advantageous when the apparatus is utilized, without the bulk curing racks 14, to dry other crops, such as grain, corn, peanuts and the like. The adjustment provided affords the operator a simple means by which the most desirable drying flow rate for each crop can be utilized.

It will be understood that the above-described equipment is produced commercially by the Powell Manufacturing Co. Inc. of Bennettsville, South Carolina. A commercial bulk curing system sold under the trademark "POWELL 77" (three tier) was utilized to practice the principles of the present method to achieve successful bulk curing of primed burley tobacco leaves in a curing cycle of approximately 7 days. This equipment provides a loading area of 771 square feet and utilizes 150 racks. It handles approximately 3,080 pounds of cured leaf per cure (18,000 pounds of cured leaf for six primings). A first specific example of a successful cure is given below.

Varieties: Burley Va. 509
Priming: 3rd (consisting of 8th, 9th, 10th and/or 11th leaf).
Amount: 15 to 25 pounds cured leaf per rack (3 to 5 lb/sq.ft. of rack loading area)
Condition of green leaf: mature leaf with slight yellow cast.
Condition of cured leaf: good appearing grade which should sell at least at market average.
Furnace started at 5°F above inside temperature and raised 5° per hour to 95°F.

| TIME | DRY BULB | WET BULB* | AIR SETTING | EXPLANATION |
| --- | --- | --- | --- | --- |
| 0 hrs. | 95° | 92° | 3 | Raise 1°/hour to 105°F. |
| 10 hrs. | 105° | 100° | 3 | Hold until bottom leaves colored properly |
| 50 hrs. |  |  | 3 | Raise 1°/hour to 110°F. |
| 55 hrs. | 110° | 105° | 5 | Hold until middle tier colored properly. |
| 60 hrs. |  |  |  | Raise 1°/hour to 115°F. |
| 65 hrs. | 115° | 107° | 5 | Hold until top tier colored properly. |
| 70 hrs. |  |  | 5 | Raise 1°/hour to 125°F. |
| 80 hrs. | 125° | 110° | 7 | Hold until top leaves are wilted. |
| 85 hrs. |  |  | 7 | Raise 2°/hour to 155°F. |
| 100 hrs. | 155° | 110° | 7 | Hold until stem dry. Dampers shut. |
| 150 hrs. |  |  | 7 | Stems should be dry. |
| 150–154 hrs. | 90° |  | 7 | Order to 18% moisture content. |

*Furnace Dampers were adjusted to hold Wet Bulb readings. Water was added when needed.

As second and third examples, the first example was repeated using Clay 2110 variety and Kentucky 54 variety with all other conditions as specified being substantially the same.

It should be understood that a good grade burley tobacco is brown in color. The chemical make-up of the cured burley tobacco differs from the chemical make-up of cured bright leaf tobacco which is yellow in color. Consequently, the present invention can in no wise be considered the same as curing bright leaf tobacco to a brown color, since the resultant product would differ chemically from cured burley.

In the above specific example the period from 0–70 hours constitutes the initial coloring stage, the period from 70 hours to 85 hours constitutes the second leaf drying stage, the period from 85 hours to 150 hours constitutes the third stem drying stage and the period from 150 hours to 154 hours constitutes the fourth ordering stage.

An understanding of how the cure is accomplished within these time periods can perhaps best be obtained by considering the changing conditions which occur throughout the vertical extent of the bulked leaves viewed in the direction of air flow which, as shown, is upwardly (but which may be downwardly if desired). The time periods given above are actually only in phase with respect to the top leaves, the time periods of the four phases for the bottom leaves will be less throughout. This progressive phasing exists due to the fact that when the temperature of the environmental air is increased the leaf will give off moisture until a condition of equilibrium is reached. This condition of equilibrium occurs progressively upwardly through the leaves because as the portions of the leaves on the bottom give off moisture the evaporative cooling effect decreases the temperature of the air contacting the upper leaves.

To illustrate this phenomena, assume that at zero hours a condition of equilibrium exists and the curing air dry bulb temperature is increased 1° from 95°F to 96°F. This increase in the curing air temperature causes the lower leaves to give off moisture but by the time that the air reaches the upper leaves the moisture given off by the lower leaves has lowered the air temperature such that the upper leaves are not contacted by air at an increased temperature. As the lower leaves reach equilibrium the air temperature is not reduced as it flows thereby so that the next higher leaves become subjected to higher temperature until they, too, reach eqilibrium and so forth on up the vertical extent of the leaves until finally all of the leaves are in equilibrium at the higher air temperature.

Thus, during the first 10 hours, it is only the lower leaves which are actually contacted by air which increases in temperature 1°F/per hour from 95° to 105°F. The actual air temperatures contacting the upper leaves will be less. During the period 10 hours to 50 hours when the air temperature is held at 105°, the upper leaves will reach a condition of equilibrium so that at the end of 50 hours it will be understood that the lower leaves would have been subjected to air temperature conditions of 96°F during 0–1 hours, 97°F during 1–2 hours, etc. up to 105°F during 10–50, whereas the upper leaves may have been subjected to the 105°F temperature only during 30 to 50 hours. In the specific example, the bottom leaves presented the desired brown color at the end of 50 hours so that a raise in temperature was then effected to set the color and stop the chemical reactions within this leaf. This raise in temperature is accomplished (at intervals of 1°F per hour up to 110°) during the period 50 to 60 hours. However, this increased air temperature is not presented to the upper leaves because of the phenomena previously mentioned. Nevertheless, within this 10 hour period, the middle tobacco has now had sufficient total time to color to the desirable brown shade so that another gradual increase in input air temperature was effected which will raise the temperature of the air contacting the middle leaves to set the color and arrest the chemical reactions therein. This increase is accomplished during the period 60 to 65 hours and held until 70 hours. During this later 10 hour period the top leaves reach the desired brown color completing the coloring phase. Again, the air temperature is increased to set the color and arrest the chemical reactions in the top leaves.

It will be understood that a similar lag will occur at the end of the leaf drying stage, the 85 hour time notation in the schedule being the time when the upper leaves are finally dried as determined by their wilted appearance (the lower leaves having been dried prior to this time). Likewise, the 150 hour time notation in the schedule is the time when the stems of the upper leaves are finally dried.

In the above specific example, the dry bulb temperature iis measured just below the lower tier of tobacco, the wet bulb is measured jet above the upper tier of tobacco, as taught in the aforesaid Wilson U.S. Pat. No. 3,503,137 (column 8, lines 16–36) and as embodied in the commercial equipment identified above. The air settings refer to the settings of the adjusting mechanism with openings 82 which are number 1 through number 7, as in FIG. 4, and as embodied in the commercial equipment.

The fourth specific example of a successful cure is given below:

Varieties: Burley Va. 509
Priming: 6th (consisting of 19th, 20th, 21st and/or 22nd leaf).
Amount: 15 to 25 pounds cured leaf per rack (3 to 5 lb/sq.ft. of rack loading area)
Condition of green leaf: very mature leaf with moderate yellow cast.
Condition of cured leaf: good appearing grade which should sell at least at market average.
Furnace started at 5°F above inside temperature and raised 5° per hour to 95°F.

| TIME | DRY BULB | WET BULB* | AIR SETTING | EXPLANATION |
|---|---|---|---|---|
| 0 hrs. | 95° | 92° | 2 | Raise 1°/hour to 105°F. |
| 10 hrs. | 105° | 102° | 2 | Hold until bottom leaves partially colored and good wilt. |
| 35 hrs. | | | 2 | Raise 1°/hour to 110°F. |
| 40 hrs. | 110° | 105° | 2 | Hold until middle leaves partially colored and good wilt. |
| 55 hrs. | | | | Raise 1°/hour to 115°F. |
| 60 hrs. | 115° | 108° | 3 | Hold until top leaves colored properly. |
| 65 hrs. | | | 3 | Raise 1°/hour to 125°F. |
| 75 hrs. | 125° | 110° | 4 | Hold until top leaves are wilted and fully colored around stem. |

-continued

| TIME | DRY BULB | WET BULB* | AIR SETTING | EXPLANATION |
|---|---|---|---|---|
| 80 hrs. | | | 7 | Raise 2°/hour to 155°F. |
| 95 hrs. | 155° | 110° | 7 | Hold until stem dry. Dampers shut. |
| 140 hrs. | | | 7 | Stems should be dry. |
| 140–144 hrs. | 90° | | 7 | Order to 18% moisture content. |

*Furnace Dampers were adjusted to hold Wet Bulb readings. Water was added when needed.

From Examples 1 and 4 above, it can be deduced that the maximum coloring temperature and minimum coloring humidity can be increased as the maturity of the burley leaf before curing is advanced. The coloring time can be decreased as the coloring temperature and relative humidity are increased. For any given leaf variety and maturity stage before curing, a more rapid coloring can be effected by approaching the maximum allowable coloring temperature. The maximum allowable coloring temperature can be obtained by maintaining the highest possible relative humidity condition without causing substantial moisture to deposit on the leaves which will ruin the cure.

By following the principles of the present invention a successful cure within 7 days can be obtained throughout the leaf ripening season even though the rate of ripening may be slower than usual in any given season simply by choosing a coloring temperature which is high enough to complete coloring within the requisite time period but low enough to prevent premature completion of the coloring phase and a coloring relative humidity which is high enough to prevent premature completion of the coloring phase at the temperature conditions shown but low enough to prevent substantial deposit of moisture on the leaves during the cure.

It will be understood that while variable flow characteristics are preferred, successful curing within the approximate 7 day total time period can be obtained with constant flow, as for example, 45 cfm per square foot of effective curing area.

It will also be understood that while it is preferred to support the burley tobacco in bulk during the cure with pronged racks, the present invention also contemplates bulk curing the burley leaves while supported in bulk with other instrumentalities. Moreover, the invention contemplates bulk curing not only primed burley leaves, but parts of primed burley leaves as well.

With the above in mind, a generally applicable schedule which accounts for variables is set forth below.

POWELL BURLEY BULK CURING SCHEDULE

After loading, start furnace and raise setting 5°F above temperature at which furnace starts. Raise to 95°F at ½° to 5° per hour. Hold at 95°F until Wet Bulb temperature of 92° or 93° is secured by closing furnace dampers. Moisture should be added during the cure to obtain the proper humidity if at any time during the cure a proper Wet Bulb is not secured.

The following Suggested Schedule should be used. It may vary because of variety, cultural practices (including fertilization), moisture, soil conditions, climatic conditions and other variables. The Dry Bulb Schedule shown is the Dry Bulb temperature of air entering the tobacco. (Air may move through the tobacco either upward or downward)

| TIME | DRY BULB At Air Inlet To Tobacco | WET BULB | HUMIDITY At Air Inlet To Tobacco | AIR SETTING (cfm) | EXPLANATION* |
|---|---|---|---|---|---|
| 0 hrs. | 95° | 92° | (90%) | 30–45 | Raise ½°–5° per hour to 105° Dry Bulb, keeping Wet Bulb 2°–4° below Dry Bulb. |
| 10 hrs. | 105° | 101° | (90%) | 30–45 | Hold until proper chemical reactions have taken place which are recognized by desirable color on lowest tobacco. Time may vary depending on tobacco put in, but normally 30–60 hours. |
| 50 hrs. | | | (85%–90%) | 30–45 | Raise ½°–5° per hour to 110°–112° Dry Bulb, keeping Wet Bulb 5°–7° below Dry Bulb. |
| 55 hrs. | 110° | 105° | (85%) | 30–45 | Hold until tobacco 2–3 feet up obtains the desired color. |
| 60 + | | | (75%–80%) | 30–45 | Raise ½°–5° per hour to 115°–118° Dry Bulb, keeping Wet Bulb 6°–10° below Dry Bulb. |
| 65 hrs. | 115° | 107° | (76%) | 40–65 | Hold until tobacco at top obtains the desired color. |
| 70 + | | | | | Raise ½°–5° per hour to 125° Dry Bulb, keeping Wet Bulb at about 110°. |
| 80 hrs. | 125° | 110° | (61%) | 40–65 | Hold if leaf on top is not properly wilted and browning gone from around stems. |
| 85 hrs. | | | | | Raise ½°–5° per hour to desired drying temperature. Dampers should be nearly |

| TIME | DRY BULB At Air Inlet To Tobacco | WET BULB | HUMIDITY At Air Inlet To Tobacco | AIR SETTING (cfm) | EXPLANATION* |
|---|---|---|---|---|---|
| | | | | | -continued |
| | | | | | closed or closed to aid in drying. |
| 90 hrs. | 150° | (110°) | | 40–65 | Hold until stems are dry. Stems should be dry. |
| 150 hrs. ± 2–8 hrs. | | | | 40–65 | Reduce temperature and add moisture to bring tobacco to proper handling order (about 18% moisture content). |

*This is written based on an upward flow of air

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A method of curing green primed burley tobacco leaves in a condition of whole leaves and/or parts thereof which comprises the steps of supporting a compacted bulk mass of primed burley leaves within a confined zone with the flat surfaces of the burley leaves disposed generally vertically at positions such that a flow of forced air within said confined zone will pass between the flat surfaces of the burley leaves of said compacted bulk mass, establishing a substantially continuous flow of forced air vertically between the flat surfaces of the burley leaves of said compacted bulk mass while said bulk mass is supported within said confined zone for a first time period at a temperature less than a predetermined level while controlling the relative humidity of the air sufficient to maintain a relatively high moisture content level in the burley leaves so that substantially all of the chlorophyll in the burley leaves is oxidized unmasking sequentially the yellow and brown pigments present in the burley leaves, substantially continuously maintaining a forced flow of air while maintaining said support of the bulk mass within said confined zone for a generally immediately following second time period at a temperature which is gradually increased and held at an intermediate elevated level while controlling the relative humidity of the air sufficient to initially arrest any chemical action taking place at the end of the first time period including the aforesaid chlorophyll oxidation and to dehydrate the burley leaves to an intermediate lower moisture content level at the end of the second time period, substantially continuously maintaining a forced flow of air while maintaining said support of the bulk mass within said confined zone for a generally immediately following third time period at a temperature which is gradually increased and held at an upper elevated level while controlling the relative humidity of the air sufficient to bring the burley leaves to a crisp and fragile condition at the end of the third time period, and maintaining air at a reduced temperature level in contact with the burley leaves while maintaining said support of the bulk mass for a generally immediately following fourth time period while controlling the relative humidity of the air sufficient to provide the burley leaves with a final moisture content permitting them to be handled without substantial breakage, the improvement in said procedural steps wherein said first time period does not exceed approximately 80 hours and the total of said first, second, third and fourth time periods does not exceed approximately 168 hours, and wherein the temperature of the air contacting the burley leaves during said first period is gradually increased at a rate not less than approximately $\frac{1}{8}°$ per hour and not greater than approximately 5° per hour until a temperature of approximately 105°F is reached which temperature is held until the desired brown color is reached.

2. A method as defined in claim 1 wherein said compacted bulk mass of primed burley is supported in the form of a plurality of compact bulk bundles, each of said bulk bundles being formed by assembling a multiplicity of whole burley leaves together into a loose bulk form with the flat surfaces in parallel relation, compacting and peripherally confining the assembled burley leaves into said compact bulk bundle and providing interior support within the peripheral confinement at spaced positions through substantially all of the leaves of the compact bulk bundle intermediate the ends of the leaves, said plurality of bulk bundles being supported within said confined zone by the peripheral confinements thereof.

3. A method as defined in claim 2 wherein said plurality of compact bulk bundles are supported within said confined zone in a plurality of vertically spaced tiers, each tier including a plurality of horizontally aligned compact bulk bundles disposed with respect to each other so as to prevent passage of air therebetween.

4. A method as defined in claim 3 wherein the number of tiers is three.

5. A method as defined in claim 4 including the steps of continuously measuring the dry bulk temperature of the flowing air entering the leaves, and continuously measuring the wet bulb temperature of the flowing air adjacent the leaves, and modifying the condition of the flow of air in accordance with the measurements taken by exhausting a portion thereof to atmosphere and introducing outside air therein and/or adding moisture thereto to maintain a desired dry bulb and wet bulb temperature measurement.

6. A method as defined in claim 5 wherein the dry bulb and wet bulb air temperatures are maintained throughout approximately in accordance with the following schedule:

| TIME | DRY BULB At Air Inlet To Tobacco | WET BULB | EXPLANATION* |
|---|---|---|---|
| 0 hrs. | 95° | 92° | Raise ½°–5° per hour to 105° Dry Bulb, keeping Wet Bulb 2°–4° below Dry Bulb. |
| 10 hrs. | 105° | 101° | Hold until proper chemical reactions have taken place which are recognized by desirable color on lowest tobacco. Time may vary depending on tobacco put in, but normally 30–60 hours. |
| 50 hrs. | | | Raise ½°–5° per hour to 110°–112° Dry Bulb, keeping Wet Bulb 5°–7° below Dry Bulb. |
| 55 hrs. | 110° | 105° | Hold until tobacco 2–3 feet up obtains the desired color. |
| 60 hrs. | | | Raise ½°–5° per hour to 115°–118° Dry Bulb, keeping Wet Bulb 6°–10° below Dry Bulb. |
| 65 hrs. | 115° | 107° | Hold until tobacco at top obtains the desired color. |
| 70 hrs. | | | Raise ½°–5° per hour to 125° Dry Bulb, keeping Wet Bulb at about 110°. |
| 80 hrs. | 125° | 110° | Hold if leaf on top is not properly wilted. |
| 85 hrs. | | | Raise ½°–5° per hour to desired drying temperature. Dampers should be nearly closed or closed to aid in drying. |
| 90 hrs. 150 hrs. 2–8 hrs. | 150° | (110°) | Hold until stems are dry. Stems should be dry. Reduce temperature and add moisture to bring tobacco to proper handling order (about 18% moisture content). |

*This is written based on an upward flow of air

7. A method as defined in claim 6 wherein said air flow is maintained constant throughout at approximately 45 cubic feet per minute per square foot of air flow passage area through said confined zone.

8. A method as defined in claim 6 wherein said air flow is varied in accordance with the following schedule given in feet per minute per square foot of air flow passage area through said confined zone:

| TIME | AIR SETTING (cmf) |
|---|---|
| 0 hrs. | 30–45 |
| 10 hrs. | 30–45 |
| 50 hrs. | 30–45 |
| 55 hrs. | 30–45 |
| 60 hrs. | 30–45 |
| 65 hrs. | 40–65 |
| 70 hrs. | |

-continued

| TIME | AIR SETTING (cmf) |
|---|---|
| 80 hrs. 85 hrs. | 40–65 |
| 90 hrs. 150 hrs. | |
| 2–8 hrs. | 40–65 |

9. A method as defined in claim 1 including the steps of continuously measuring the dry bulb temperature of the flowing air entering the leaves, and continuously measuring the wet bulb temperature of the flowing air adjacent the leaves, and modifying the condition of the flow of air in accordance with the measurements taken by exhausting a portion thereof to atmosphere and introducing outside air therein and/or adding moisture thereto to maintain a desired dry bulb and wet bulb temperature measurement.

* * * * *